(12) United States Patent
Lee

(10) Patent No.: US 9,521,271 B2
(45) Date of Patent: Dec. 13, 2016

(54) ELECTRONIC APPARATUS HAVING AUTOMATICALLY ACTIVATED WIFI DIRECT FUNCTION, PRINT CONTROLLING METHOD, AND COMPUTER-READABLE RECORDING MEDIUM TO ACTIVATE THE WIFI DIRECT FUNCTION

(71) Applicant: Samsung Electronics Co., Ltd, Suwon-si, Gyeonggi-do (KR)

(72) Inventor: Sang-min Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 32 days.

(21) Appl. No.: 13/908,144

(22) Filed: Jun. 3, 2013

(65) Prior Publication Data
US 2014/0118776 A1 May 1, 2014

(30) Foreign Application Priority Data
Oct. 29, 2012 (KR) .......................... 10-2012-0120693

(51) Int. Cl.
*H04N 1/00* (2006.01)
*G06F 3/12* (2006.01)

(52) U.S. Cl.
CPC ............ *H04N 1/001* (2013.01); *G06F 3/1204* (2013.01); *G06F 3/126* (2013.01); *G06F 3/1226* (2013.01); *G06F 3/1288* (2013.01); *G06F 3/1292* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2011/0134465 A1 | 6/2011 | Gha | |
| 2012/0320413 A1* | 12/2012 | Nagasaki | 358/1.15 |
| 2013/0100486 A1* | 4/2013 | Mccoog et al. | 358/1.15 |

FOREIGN PATENT DOCUMENTS

| | | |
|---|---|---|
| EP | 2387206 | 11/2011 |
| KR | 2012-0045628 | 5/2012 |

OTHER PUBLICATIONS

European Search Report dated Jul. 7, 2014 issued in EP Application No. 13169220.4.

* cited by examiner

*Primary Examiner* — Qian Yang
(74) *Attorney, Agent, or Firm* — Staas & Halsey LLP

(57) ABSTRACT

An electronic apparatus includes a network manager to deactivate a WiFi Direct function of the electronic apparatus when an application to perform a print job is operated and which is connected to an image forming apparatus around the electronic apparatus using a WiFi Direct method, a job generator to generate print data regarding a file based on an input print command to print the file, and a controller to transmit the generated print data to the image forming apparatus that is connected using the WiFi Direct method.

17 Claims, 13 Drawing Sheets

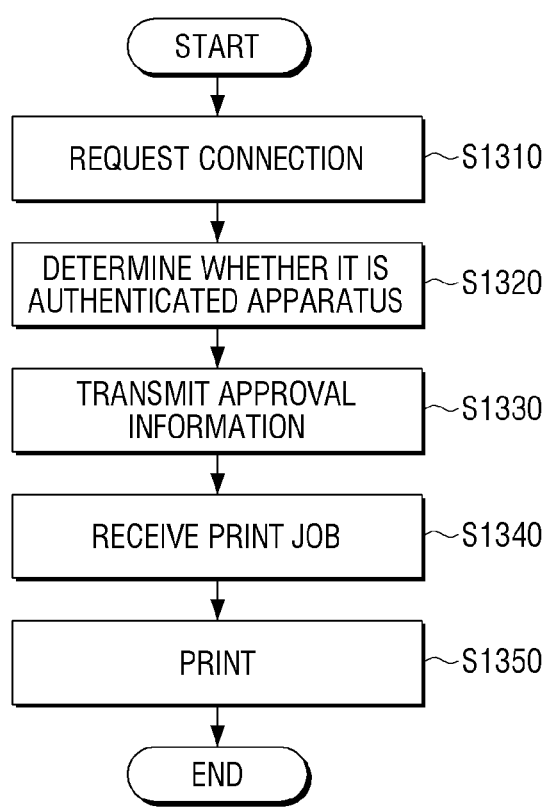

ELECTRONIC APPARATUS HAVING AUTOMATICALLY ACTIVATED WIFI DIRECT FUNCTION, PRINT CONTROLLING METHOD, AND COMPUTER-READABLE RECORDING MEDIUM TO ACTIVATE THE WIFI DIRECT FUNCTION

CROSS-REFERENCE TO RELATED APPLICATIONS

This application claims priority under 35 U.S.C. §119(a) from Korean Patent Application No. 2012-0120693, filed in the Korean Intellectual Property Office on Oct. 29, 2012, the content of which is incorporated herein by reference in its entirety.

BACKGROUND OF THE INVENTION

1. Field of the Invention

The present general inventive concept relates to an electronic apparatus, an image forming apparatus, a print controlling method, an image forming method, and a computer-readable recording medium, and more particularly, to an electronic apparatus capable of performing a print job using a WiFi Direct connection method without a separate setting process, an image forming apparatus, a print controlling method, an image forming method, and a computer-readable recording medium.

2. Description of the Related Art

An image forming apparatus includes an apparatus that prints print data generated by a print controlling terminal apparatus such as a computer on a recording paper, and examples of an image forming apparatus include copy machine, printer, fax machine, scanner, and a Multi-Function Peripheral (MFP) that performs the above functions in a single device.

A recent image forming apparatus is capable of receiving a print job not only through a terminal apparatus such as a computer, but also directly from a mobile apparatus by supporting a WiFi Direct connection method.

Herein, WiFi Direct is a standard that allows Wi-Fi devices to connect to each other without the need for an additional wireless access point and without using a wireless router. In order to perform a print job in a mobile apparatus using such a WiFi function, a user needs to perform a setting operation of connecting the mobile apparatus with the image forming apparatus before driving an application to perform the print job.

However, the process of connecting a mobile apparatus with a printer using a WiFi Direct connection method is difficult, since a user is required to use a system menu to perform the function involving network connection of the general mobile apparatus.

In addition, in order to complete WiFi Direct connection, the user needs to have confirmation from a counterpart of the connection (specifically, an image forming apparatus). Specifically, the user needs to conduct a series of operations including changing a setting of Direct connection in the mobile apparatus, performing an operation of searching and selecting an image forming apparatus to be connected, moving to the corresponding image forming apparatus and confirming (approving or authenticating) his or her mobile apparatus.

Accordingly, even if printing using a WiFi Direct connection, which is an easy connection method between wireless communication apparatuses, is available, the user may have difficulties in utilizing such a function.

SUMMARY OF THE INVENTION

The present general inventive concept provides an electronic apparatus to perform a print job using a WiFi Direct connection method without a separate setting process, an image forming apparatus, a print controlling method, an image forming method, and a computer-readable recording medium.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing an electronic apparatus including a network manager to deactivate a WiFi Direct function of the electronic apparatus when an application to perform a print job is operated and which is connected to an image forming apparatus around the electronic apparatus using a WiFi Direct method, a job generator to generate print data regarding a file based on an input print command to print the file, and a controller to transmit the generated print data to the image forming apparatus that is connected using the WiFi Direct method.

The network manager may search wireless communication apparatuses around the electronic apparatus that support communication according to a WiFi Direct method, and connects to one of the searched wireless communication apparatuses.

The network manager may identify image forming apparatuses from the searched wireless communication apparatuses and connect to the wireless communication apparatuses that are identified as image forming apparatuses according to the WiFi Direct method.

The network manager may identify image forming apparatuses using information regarding apparatus type of the searched wireless communication apparatuses.

The apparatus may further include a user interface unit that displays the wireless communication apparatuses that are identified as image forming apparatuses, and receives a selection of one wireless communication apparatus from among the displayed wireless communication apparatuses, and the network manager may connect to the selected wireless communication apparatus according to a WiFi Direct method.

The user interface unit may display searched wireless communication apparatuses when there are a plurality of wireless communication apparatuses that are identified as the image forming apparatuses.

The network manager may transmit connection request information including preset authentication information to the image forming apparatus, and if approval information is received from the image forming apparatus, may connect to the image forming apparatus using a WiFi Direct method.

The preset authentication may be at least one of information on the application and a pin code pre-stored in the image forming apparatus.

The network manager may connect to a network image forming apparatus around the electronic apparatus using a wireless network method when there is no image forming apparatus which supports communication according to a WiFi Direct method around the electronic apparatus.

The network manager may turn off a WiFi Direct function of the electronic apparatus if the electronic apparatus does not support both a WiFi Direct method and a wireless network method simultaneously.

The controller may control the network manager to connect to an image forming apparatus using a wireless network method if the electronic apparatus does not support both a WiFi Direct method and a wireless network method simultaneously, and the file includes Internet contents.

The foregoing and/or other features and utilities of the present general inventive concept may also be achieved by providing an image forming apparatus including a communication interface unit to receive a connection request information from an electronic apparatus using a WiFi Direct method, an authentication unit to connect to the electronic apparatus using a WiFi Direct method if a user approval command regarding the electronic apparatus is input, or preset authentication information is included in the received connection request information, and an image forming unit that, if print data is received from the electronic apparatus using a WiFi Direct method, prints the received print data.

The foregoing and/or other features and utilities of the present general inventive concept may also be achieved by providing a print controlling method of an electronic apparatus including if an application to perform a print job is operated, activating a WiFi Direct function of the electronic apparatus, connecting to an image forming apparatus around the electronic apparatus using a WiFi Direct method, generating print data regarding a file based on an input print command to print the file, and transmitting the generated print data to the image forming apparatus that is connected using a WiFi Direct method.

The connecting may include searching wireless communication apparatuses around the electronic apparatus that support communication according to a WiFi Direct method, and connecting to one of the searched wireless communication apparatuses.

The connecting may include identifying image forming apparatuses from the searched wireless communication apparatuses and connecting to the wireless communication apparatuses that are identified as image forming apparatuses according to the WiFi Direct method.

The connecting may include identifying image forming apparatuses using information regarding apparatus type of the searched wireless communication apparatuses.

The method may further include displaying the wireless communication apparatuses that are identified as image forming apparatuses and receiving a selection of one wireless communication apparatus from among the displayed wireless communication apparatuses, and the connecting may include connecting to the selected wireless communication apparatus according to a WiFi Direct method.

The displaying may include displaying searched wireless communication apparatuses when there are a plurality of wireless communication apparatuses that are identified as the image forming apparatuses.

The connecting may include transmitting connection request information including preset authentication information to the image forming apparatus, and if approval information is received from the image forming apparatus, connecting to the image forming apparatus using a WiFi Direct method.

The preset authentication may be at least one of information on the application and a pin code pre-stored in the image forming apparatus.

The connecting may include connecting to a network image forming apparatus around the electronic apparatus using a wireless network method when there is no image forming apparatus that supports communication according to a WiFi Direct method around the electronic apparatus.

The method may further include turning off a WiFi Direct function of the electronic apparatus if the electronic apparatus does not support both a WiFi Direct method and a wireless network method simultaneously.

The connecting may include connecting to an image forming apparatus using a wireless network method if the electronic apparatus does not support both a WiFi Direct method and a wireless network method simultaneously and the file includes Internet contents.

The foregoing and/or other features and utilities of the present general inventive concept may also be achieved by providing an image forming method of an image forming apparatus including receiving a connection request information from an electronic apparatus using a WiFi Direct method, if a user approval command regarding the electronic apparatus is input, or preset authentication information is included in the received connection request information, connecting to the electronic apparatus using a WiFi Direct method, receiving print data from the electronic apparatus using a WiFi Direct method, and printing the received print data.

The foregoing and/or other features and utilities of the present general inventive concept may also be achieved by providing a non-transitory computer readable recording medium including a program to execute a print controlling method of an electronic apparatus according to an exemplary embodiment, the print controlling method including, if an application to perform a print job is operated, activating a WiFi Direct function of the electronic apparatus, connecting to an image forming apparatus around the electronic apparatus using a WiFi Direct method, generating print data regarding a file based on an input print command to print the file, and transmitting the generated print data to the image forming apparatus that is connected using a WiFi Direct method.

The foregoing and/or other features and utilities of the present general inventive concept may also be achieved by providing an electronic apparatus, including a network manager to selectively activate and deactivate a WiFi Direct function according to an operation of an application to perform a print job corresponding to a file in at least one image forming apparatus, and a communication interface unit to transmit print data from the electronic apparatus to the connected at least one image forming apparatus via the WiFi Direct function.

The electronic apparatus may further include a user interface unit to display a list of the at least one image forming apparatus to allow a user to select the at least one image forming apparatus therefrom.

The user interface unit may allow the user to set options regarding the print job.

The user interface unit may allow the user to authenticate the electronic apparatus connected to the at least one image forming apparatus using at least one of a pin code, a password, application information, and preset authentication information.

If there is not at least one image forming apparatus supporting the WiFi Direct standard, the network manager automatically may connect the electronic apparatus to an image forming apparatus via a wireless network method.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 13 is a flowchart illustrating an image forming method according to an exemplary embodiment of the present general inventive concept;

DETAILED DESCRIPTION OF THE PREFERRED EMBODIMENTS

Figure 1:
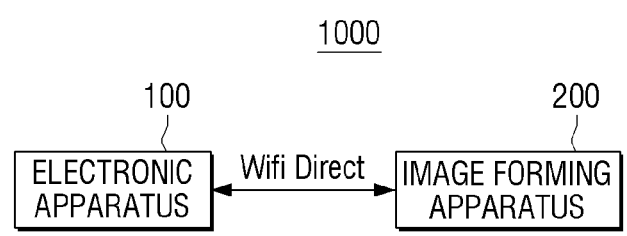
FIG. 1 is an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is an image forming system 1000 according to an exemplary embodiment of the present general inventive concept.

Referring to FIG. 1, the image forming system 1000 includes an electronic apparatus 100 and an image forming apparatus 200.

The electronic apparatus 100 may transmit print data to the image forming apparatus 200. Herein, the electronic apparatus 100 may be a PC, a notebook computer, a mobile phone, a smart phone, a PMP, or an MP3 that supports WiFi Direct, but is not limited thereto. The WiFi Direct is a standard that allows Wi-Fi devices to connect to each other without the need for a wireless access point.

Specifically, if the electronic apparatus 100 receives a selection of an application (e.g., a print application) to perform a print job from a user, the electronic apparatus 100 may drive the selected application and at the same time, activate the WiFi Direct function. Subsequently, the electronic apparatus 100 may connect to the image forming apparatus 200 that is relatively close proximity to the electronic apparatus 100 using the WiFi Direct method, and perform the print job by transmitting print data to the connected image forming apparatus 200.

The operation of the electronic apparatus 100 may be performed by an application that is installed in the operating system of the electronic apparatus 100. The specific operations and configuration of the electronic apparatus 100 will be explained later with reference to FIGS. 2 and 3.

The image forming apparatus 200 performs the print job regarding the received print data. Herein, the image forming apparatus refers to an apparatus that generates, prints, receives and transmits image data, and examples of the image forming apparatus include a printer, a scanner, copy machine, fax machine, and a Multi-Function Peripheral (MFP) which performs the above functions in a single device, but is not limited thereto.

Specifically, in response to receiving a connection request information from the electronic apparatus 100, the image forming apparatus 200 may authenticate the electronic apparatus in accordance with a user's authentication command (i.e., a manual authentication) or may authenticate the electronic apparatus by determining whether preset authentication information is included the connection request information (i.e., an automatic authentication). Once a link is formed with the electronic apparatus 100 supporting the WiFi Direct method and print data is received through the formed wireless link after the authentication process, the image forming apparatus 200 may perform the print job regarding the received print data. Specific operations and configurations of the image forming apparatus 200 will be explained later with reference to FIG. 8.

As such, in the image forming system 1000 according to an exemplary embodiment, if a print application is operated in the electronic apparatus 100, the WiFi Direct function is activated automatically without any separate user setting, and thus a user does not need to activate the WiFi Direct function that is difficult to find in a system menu. In addition, the image forming apparatus 200 may perform authentication of the WiFi Direct connection requested by the electronic apparatus 100 automatically without user authentication, and thus may perform wireless connection between the electronic apparatus 100 and the image forming apparatus 200 in more rapid manner.

Meanwhile, in the above description regarding FIG. 1, the electronic apparatus 100 is connected to one image forming apparatus 200, but the electronic apparatus 100 may be connected to a plurality of image forming apparatuses 200, and a plurality of electronic apparatuses 100 may be connected to one image forming apparatus 200. In addition, in the above description, the electronic apparatus 100 and the image forming apparatus 200 are connected using only the WiFi Direct method, but if the image forming apparatus 200 is a network printer of a network method, the electronic apparatus 100 and the image forming apparatus 200 may be connected using a wireless network method as well.

Figure 2:
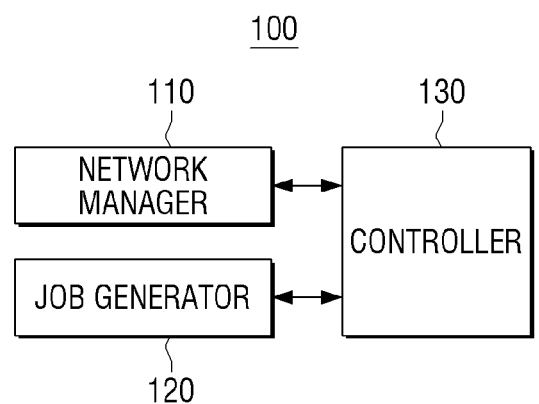
FIG. 2 is a schematic block diagram illustrating an electronic apparatus according to an exemplary embodiment of the present general inventive concept.

FIG. 2 is a schematic block diagram illustrating an electronic apparatus according to an exemplary embodiment of the present general inventive concept.

Referring to FIG. 2, the electronic apparatus 100 may comprise a network manager 110, a job generator 120, and a controller 130.

If an application to perform a print job is operated, the network manager 110 activates the WiFi Direct function of the electronic apparatus 100. Specifically, if a user operates an application (e.g., a print application) to perform a print job, the network manager 110 may turn on the WiFi Direct function if the WiFi Direct function is turned off.

Meanwhile, in the exemplary embodiment, if a print application is operated, the WiFi Direct function is immediately activated. However, if the print application is operated when the WiFi Direct function is turned off, a user may confirm whether to activate the WiFi Direct function first and then, the WiFi Direct function may be activated according to the user's selection.

In addition, the network manager 110 connects to an image forming apparatus in the vicinity of the electronic apparatus 100 using the WiFi Direct method. Specifically, the network manager 110 may search wireless communication apparatuses that support communication using the WiFi Direct standard that in the vicinity of the electronic apparatus 100.

Subsequently, the network manager 110 identifies the searched wireless communication apparatuses. Specifically, the network manager 110 may identify whether the wireless communication apparatuses are image forming apparatuses that support communication utilizing the WiFi Direct standard according to a type of the searched wireless communication apparatuses.

The network manager 110 connects to one of the wireless communication apparatuses that are identified as image forming apparatuses. Specifically, if there is one wireless communication apparatus that is identified as an image forming apparatus, the network manager 110 may connect to the wireless communication apparatus that is identified as an image forming apparatus using the WiFi Direct standard.

In this case, the network manager 110 may connect to the wireless communication apparatus using the WiFi Direct standard by transmitting connection request information including preset authentication information to 'the wireless communication apparatus that is identified as an image forming apparatus'. Accordingly, the wireless communication apparatus may be connected to the image forming apparatus through connection according to the WiFi Direct standard without a user authentication process in the image forming apparatus 200. Herein, the authentication information may be information of application (e.g., a mobile-print application) and a pin code pre-stored in the image forming apparatus 200.

Meanwhile, in the exemplary embodiment, the wireless communication apparatus that is identified as an image forming apparatus is connected without a separate confirmation process when only one image forming apparatus is searched, but the connection may be performed after a user confirmation of the connection even if only one image forming apparatus is searched.

On the other hand, if there are a plurality of wireless communication apparatuses that are identified as image forming apparatuses, the network manager 110 may connect to one image forming apparatus that is selected by a user from among a plurality of image forming apparatuses using the WiFi Direct standard. Specifically, the electronic apparatus 100 may display a plurality of image forming apparatuses searched by a user interface unit 150, which will be explained later, and receive a selection of an image forming apparatus from among the plurality of image forming apparatuses from a user.

Subsequently, the network manager 110 may search an image forming apparatus (specifically, a network image forming apparatus) of a wireless network method in the vicinity of an electronic apparatus. Herein, the wireless network method refers to the technology of local area communication network that enables a user to use wireless Internet in a place where an Access Point (AP) is installed using an electric wave or an infrared rays transmission method.

In addition, the network manager 110 may connect to the searched image forming apparatus that supports communication of a wireless network method using a wireless network method. That is, the network manager 110 may search and connect to an image forming apparatus using not only a wireless network, but also via WiFi Direct. Meanwhile, the operation of searching and connecting an apparatus using the wireless network method may be performed additionally in case an image forming apparatus is not searched using WiFi Direct.

If the electronic apparatus 100 does not support the WiFi Direct standard and the wireless network method simultaneously, that is, communication can be performed using only one of the two methods, the network manager 110 may selectively activate the WiFi Direct function and the wireless network function of the electronic apparatus 100. For example, if an image forming apparatus is searched using the two communication methods in the above case, an image forming apparatus that supports communication of the wireless network method may be searched first by deactivating the WiFi Direct function and activating the wireless network function, and then an image forming apparatus that supports communication of the WiFi Direct method may be searched by activating the WiFi Direct function and deactivating the wireless network method.

Subsequently, only the communication method corresponding to the selected image forming apparatus may be activated. For example, if the selected image forming apparatus is an image forming apparatus that supports only the wireless network method, and if there is no image forming apparatus that supports the WiFi Direct standard in the vicinity of the electronic apparatus, the network manager 110 may turn off the WiFi Direct function. The operation of the electronic apparatus 100 according to whether to use both the WiFi Direct method and the wireless network method will be explained later with reference to FIGS. 10 and 11.

The job generator 120 generates print data regarding a file that has received an input print command. Specifically, job generator 120 may generate print data regarding a file (e.g., an image file or a document file) for which a user wishes to perform a print job. Herein, the print data may be data in a print language such as Postscript (PS), Printer Control Language (PCL), etc., but is not limited thereto, and if the image forming apparatus 200 supports direct-printing, the print data may be a file such as PDF, XPS, BMP, JPG, etc., but is not limited thereto.

Meanwhile, if a print option is selected through the user interface unit 150, which will be explained later, the job generator 120 may generate print data by reflecting the selected print option. Meanwhile, if a file is transmitted using a direct-printing method without file conversion, the job generator 120 may convert the input print option to a command that can be recognized in the image forming apparatus 200 and transmit the converted print option to the image forming apparatus 200.

The controller 130 controls each component of the electronic apparatus 100. Specifically, when receiving a selection of an application from a user, the controller 130 may operate the application selected by the user.

If the application selected by the user is a print application to perform a print job, the controller 130 may control the network manager 110 to activate a WiFi Direct function.

The controller 130 may control the network manager 110 so that an image forming apparatus that can be connected using the activated via WiFi Direct is searched. In addition, the controller 130 may control the network manager 110 so that wireless connection with the searched image forming apparatus 200 supporting the WiFi Direct method is performed. Meanwhile, the controller 130 may control the network manager 110 so that an image forming apparatus that can be connected using a wireless network method is searched when there is no image forming apparatus supporting the WiFi-Direct standard in the vicinity of the electronic apparatus 100 or when predetermined driving conditions are satisfied (specifically, an image forming apparatus is searched regardless of whether the image forming apparatus supports the WiFi Direct method or the wireless network method).

When receiving a user-selected a file or web page for which a print job is performed, the controller 130 may control the job generator 120 to generate print data regarding the selected file or web page and transmit the generated print data to the connected image forming apparatus 200.

In the above description, the configuration of the electronic apparatus 100 is illustrated and explained only briefly, but the electronic apparatus 100 may include additional and alternative configurations. The detailed configuration of the electronic apparatus 100 will be explained with reference to FIG. 3.

Figure 3:
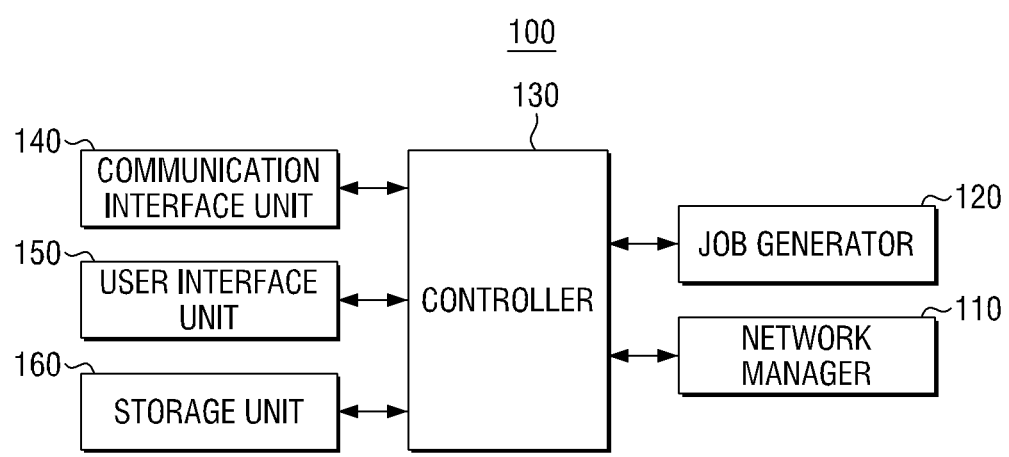
FIG. 3 is a block diagram illustrating an electronic apparatus in detail according to an exemplary embodiment of the present general inventive concept.

FIG. 3 is a block diagram illustrating the electronic apparatus 100 in detail according to an exemplary embodiment of the present general inventive concept.

Referring to FIG. 3, the electronic apparatus 100 may include the network manager 110, the job generator 120, the controller 130, a communication interface unit 140, a user interface unit 150, and a storage unit 160.

The operations of the network manager 110, the job generator 120, and the controller 130 have been explained above with reference to FIG. 2, and thus further description will not be provided.

The communication interface unit 140 is formed to connect the electronic apparatus 100 to an external apparatus (not illustrated), and the connection to the external apparatus may be performed not only through Local Area Network (LAN) and an Internet network, but also through wireless communication (e.g., GSM, UMTS, LTE, WiBRO, etc., but is not limited thereto). In this case, the communication interface unit 140 may be connected to the external apparatus using the wireless network method (e.g., wireless LAN, 3G, 4G, etc.), or using the WiFi Direct method. Meanwhile, the electronic apparatus 100 may support the wireless network method and the WiFi Direct standard simultaneously, or only one of the wireless network method and the WiFi Direct method at a time. The operations of the electronic apparatus 100 according to each state will be explained later with reference to FIGS. 10 through 12.

In addition, the communication interface unit 140 may transmit print data. Specifically, the communication interface unit 140 may transmit generated print data to a connected image forming apparatus 200 under the control of the network manager 110 that has been described above.

The user interface unit 150 includes a plurality of function keys through which a user may set or select various functions supported by the electronic apparatus 100, and may display various information provided by the electronic apparatus 100. The user interface unit 150 may include a touch screen that may perform input and output of data simultaneously, or an apparatus that combines a mouse and a monitor.

The user interface unit 150 may display a list of various applications that can be selected by a user. Specifically, the user interface unit 150 may display a user interface window to receive a selection of one of the applications installed in the electronic apparatus 100 and receive a selection of an application to be operated using the displayed user interface window. Accordingly, a user may select a print application to perform a print job through the user interface window provided by the user interface unit 150.

If the print application is operated, the WiFi Direct function of the electronic apparatus 100 is activated. As described above, the operation of searching an image forming apparatus that supports the WiFi Direct method in the vicinity of the electronic apparatus 100 is performed by the network manager 110.

Meanwhile, the user interface unit 150 may display searched wireless communication apparatuses. In this case, the user interface unit 150 may display only wireless communication apparatuses that are identified as image forming apparatuses, and such an operation of displaying wireless communication apparatuses may be performed only when a plurality of image forming apparatus are searched.

Meanwhile, in the above exemplary embodiment, only an image forming apparatus supporting the WiFi Direct method is searched and displayed, but the electronic apparatus 100 may search both an image forming apparatus supporting the WiFi Direct standard as well as an image forming apparatus supporting the wireless network method, such that the user interface unit 150 may display each of the image forming apparatuses that are connectable using each method.

That is, the electronic apparatus 100 may search and display all of connectable image forming apparatuses regardless of the connection methods. Specifically, the network manager 110 may search a network image forming apparatus supporting the wireless network method and an image forming apparatus supporting the WiFi Direct standard. Accordingly, the user interface unit 150 may display all of searched image forming apparatuses. Meanwhile, if the electronic apparatus 100 does not support the wireless network method and the WiFi Direct standard simultaneously, the electronic apparatus 100 may perform the above-described search operation by selectively activating the wireless network function and the WiFi Direct function even if there is no manipulation by a user.

The user interface unit 150 may receive a selection of one of displayed wireless communication apparatuses. Accordingly, the selected wireless communication apparatus and the electronic apparatus 100 may be connected by the network manager 110, which has been described above.

The user interface unit 150 receives a print command. Specifically, the user interface unit 150 may display a plurality of print files and receive a print command regarding at least one of the displayed print files.

In addition, the user interface unit 150 receives a print option. Specifically, the user interface unit 150 may display a user interface window to receive a setting of a print option and receive a print option to be applied to contents to be printed that are selected by a user through the displayed user interface window.

The storage unit 160 stores a program necessary to operate the electronic apparatus 100. Specifically, the storage unit 160 may store a program that is a group of various commands that are necessary to operate the electronic apparatus 100. Herein, the program includes an operating system and various applications.

In addition, the storage unit 160 stores various contents. The storage unit 160 may also store print data generated by the job generator 120, which has been described above, and a web page that is loaded through the communication interface unit 140.

Further, the storage unit 160 may store application information or information regarding a pin code that is pre-stored in an image forming apparatus 200. Herein, the application information refers to information which may identify an authenticated apparatus in the image forming apparatus 200, and may include password, pin code, and so on.

The storage unit 160 may be an internal storage medium within the electronic apparatus 100 or an external storage medium, for example, a removable disk including a Universal Serial Bus (USB) memory and a flash memory, a storage medium connected to a photographing apparatus, a web server via network, etc., but is not limited thereto.

As such, the electronic apparatus 100 according to an exemplary embodiment activates the WiFi Direct function automatically, without requiring a user setting, in response to a print application being operated, and thus there is no need for a user to activate the WiFi Direct function that is difficult to find in a system menu. In addition, authentication of the image forming apparatus 200 may be performed automatically without user authentication, and thus wireless connection with the image forming apparatus 200 may be performed in more rapid manner.

FIGS. 4 through 7 are views illustrating various examples of a user interface window that may be displayed on the user interface unit 150 of FIG. 3.

Figure 4:
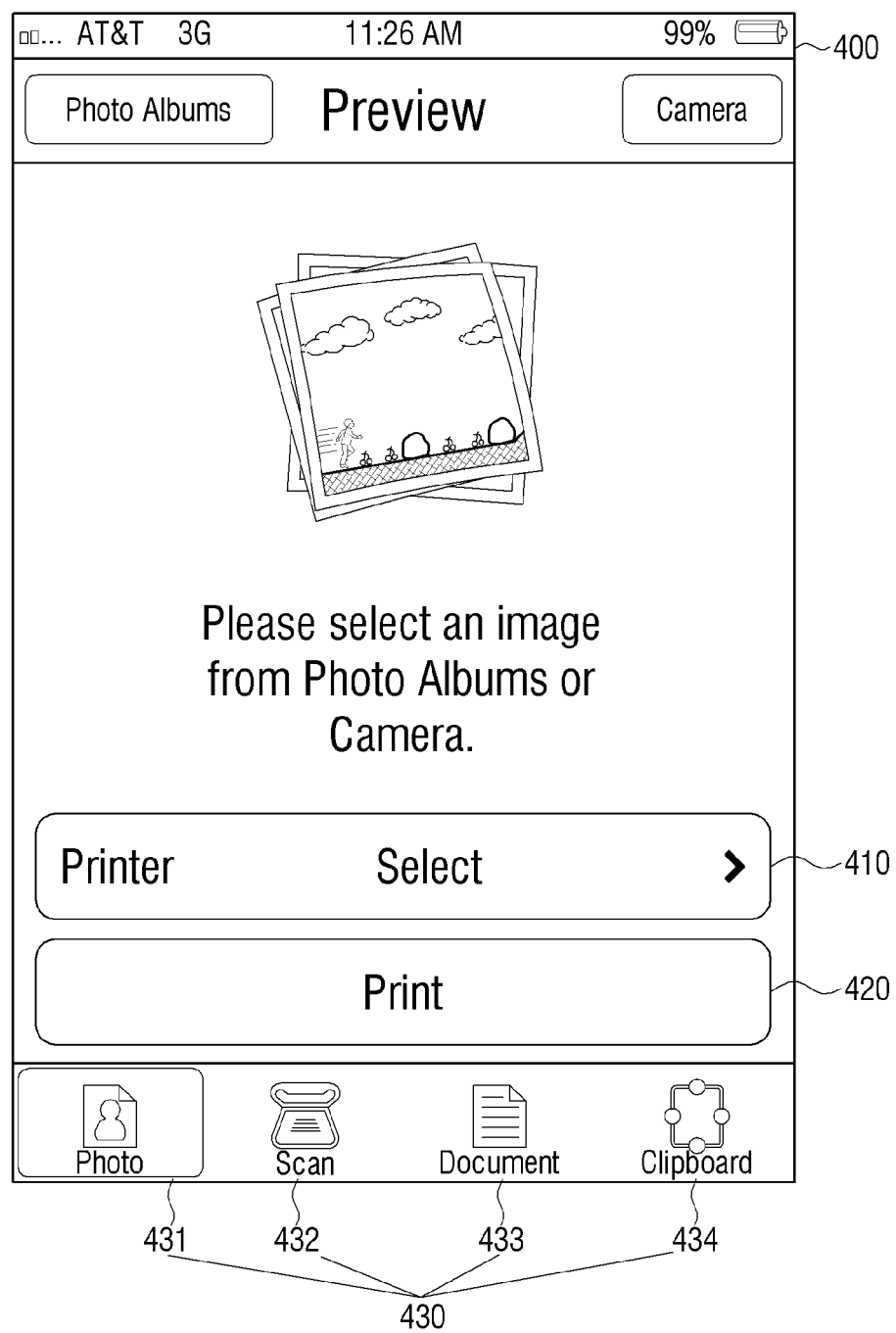
FIGS. 4 through 7 are views illustrating various examples of a user interface window that may be displayed on the user interface unit of FIG. 3.

Specifically, FIG. 4 is a view illustrating an example of a user interface window 400 that is displayed when a print application is operated.

Referring to FIG. 4, the user interface window 400 includes a first area 410, a second area 420, and a third area 430.

Figure 5:
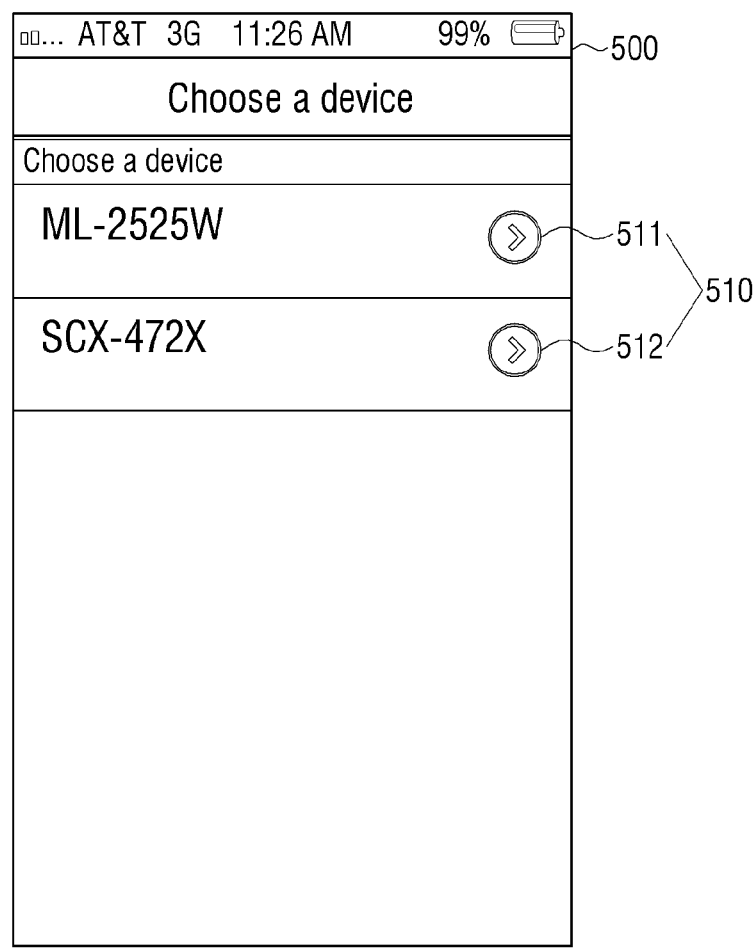

The first area 410 displays an image forming apparatus to perform a print job, or if an image forming apparatus to perform a print job is not selected, displays that it is necessary to start an operation to receive a selection of an image forming apparatus. In the exemplary embodiment, an image forming apparatus is not selected yet, and thus a necessity to select an image forming apparatus is displayed. If the first area 410 is selected, a user interface window 500 as illustrated in FIG. 5 may be displayed. If a user selects an image forming apparatus to select a print job, the first area 410 displays the selected image forming apparatus as illustrated in a first area 610 in FIG. 6.

The second area 420 receives a print command. Meanwhile, in the exemplary embodiment, contents to be printed and an image forming apparatus to perform a print job are not selected yet, and thus even if the second area 420 is selected, a print operation is not performed immediately and instead, the necessity to select an image forming apparatus and contents may be displayed.

The third area 430 receives contents to be printed. As illustrated in FIG. 4, four icons 431, 432, 433, 434 are displayed in the third area 430. The first icon 431 receives a selection of an object to be printed from among pre-stored photos. If a user selects the first icon 431, the photos pre-stored in the electronic apparatus 100 may be displayed in the form of a list or preview, and at least one of the photos may be selected as an object to be printed.

The second icon 432 is an area to receive a selection of a photo that is photographed by a camera as an object to be printed. If a user selects the second icon 432, the electronic apparatus 100 is converted to a photographing mode, and a photo that is photographed according to a user's photographing command becomes an object to be printed.

The third icon 433 is an area to receive a selection of an object to be printed from among pre-stored files. If a user selects the third icon 433, the electronic apparatus 100 displays pre-stored files in the form of a list or preview, and at least one of the files may be selected as an object to be printed, The fourth icon 434 is an area to receive a selection of an object to be printed from among contents stored in a clipboard. Specifically, a user may store a specific image, a text, etc. in a clipboard (i.e., a temporary storage space) while using an electronic apparatus 100. Accordingly, if a user selects the fourth icon 434, the contents stored in the clipboard are selected as an object to be printed.

FIG. 5 is a view illustrating an example of a user interface window 500 that can be displayed when the first area of FIG. 4 is selected.

The user interface window 500 displays an image forming apparatus that can be connected from the electronic apparatus 100.

The display apparatuses 511 and 512 are image forming apparatuses that can be connected to the electronic apparatus 100 when they are in the vicinity of the electronic apparatus 100. Specifically, if a user selects the first area of FIG. 4, the electronic apparatus 100 activates the WiFi Direct function and searches image forming apparatuses around the electronic apparatus 100 that support the WiFi Direct communication. During the searching procedure, the searched image forming apparatuses are displayed on the user interface window 500. Meanwhile, in the above description, the image forming apparatuses are searched after the first area 410 is selected, but the search operation may be performed before the first area is selected.

Meanwhile, the displayed image forming apparatuses 511, 512 may be image forming apparatuses of the WiFi Direct method or image forming apparatuses of the wireless network method. That is, what is important is which apparatus is to be connected from a user perspective, not how it is connected. Thus, the electronic apparatus 100 may search image forming apparatuses that are connectable through either the WiFi Direct method or the wireless network method and display the search result.

Although the method of communication of each image forming apparatus is not illustrated in the present exemplary embodiment, a specific icon may be displayed next to the displayed image forming apparatus so as to indicate whether the corresponding image forming apparatus is connected through the WiFi Direct method or the wireless network method.

Figure 6:
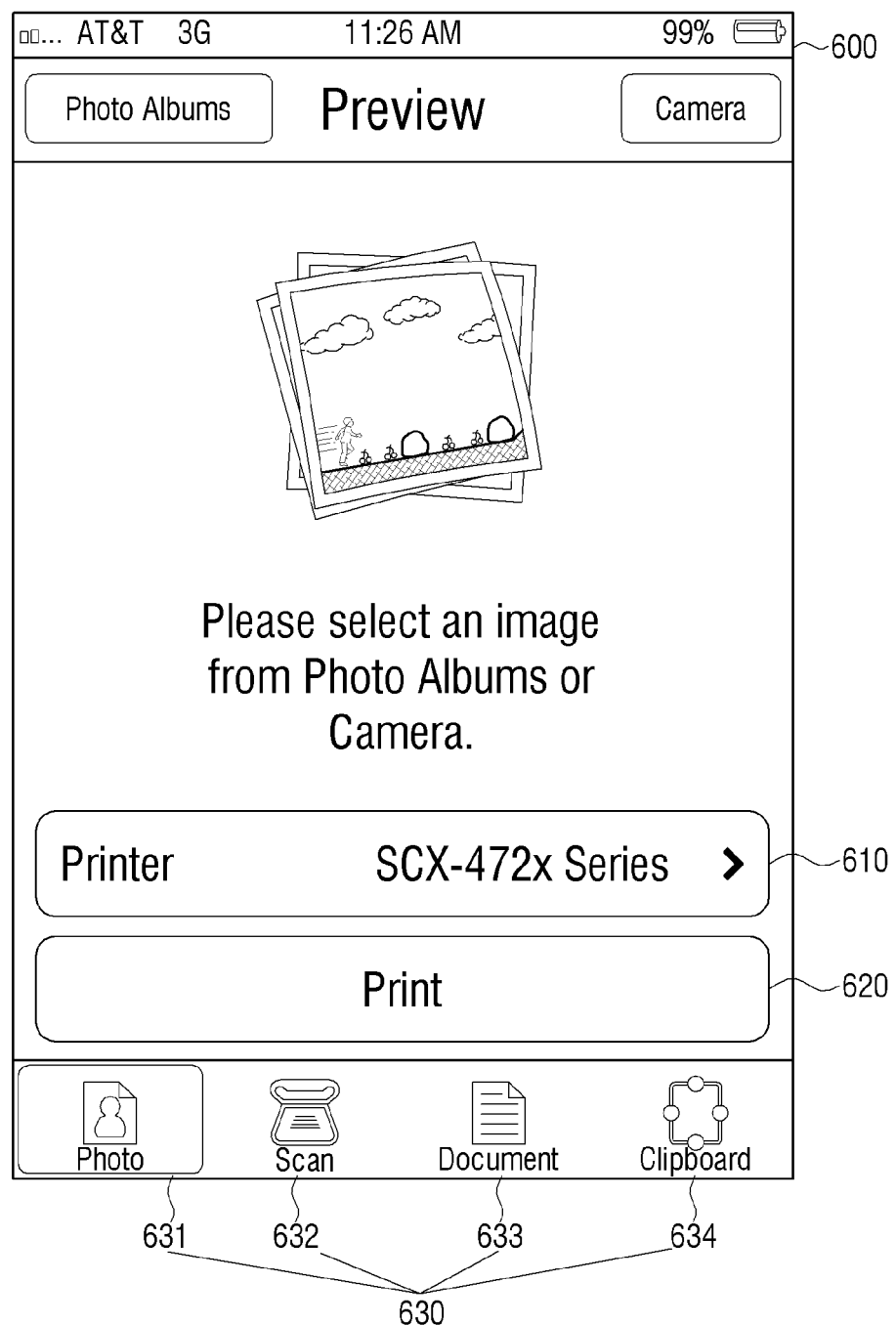

If a user selects one image forming apparatus 512 on the user interface window, the first area of the user interface window illustrated in FIG. 4 is changed to that of the user interface window as illustrated in FIG. 6.

FIG. 6 is a view illustrating an example of a user interface window 600 that can be displayed on a user interface unit when an image forming apparatus to perform a print job is selected.

Referring to FIG. 6, the user interface window 600 includes a first area 610, a second area 620, and a third area 630.

The second area 620 and the third area 630 are the same as the area 420 and the area 430 in FIG. 4, and thus further description will not be provided.

The first area 610 displays a selected image forming apparatus. Meanwhile, a user may change a selected image forming apparatus by selecting the first area again after selecting the image forming apparatus to perform a print job.

Meanwhile, referring to FIG. 6, an example of a user interface window 600 where a print job is performed after a selection of only an image forming apparatus to perform the print job and contents is received from a user has been illustrated, but the electronic apparatus 100 may receive a selection of a print option from the user as well. The example of such a user interface window will be explained below with reference to FIG. 7.

Figure 7:
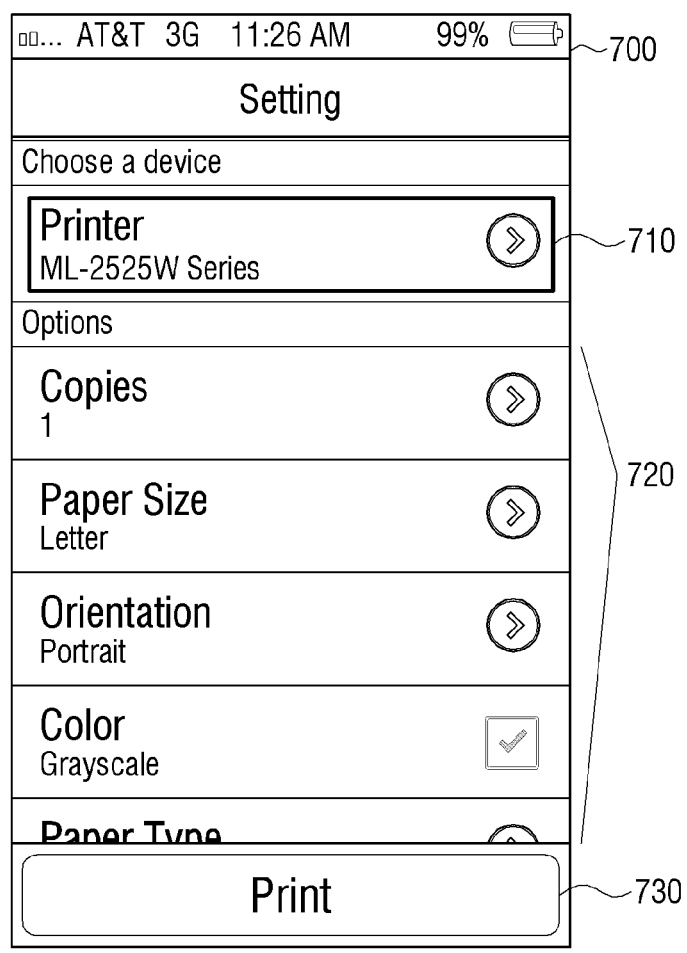

FIG. 7 is a view illustrating an example of a user interface window 700 where a print option is set.

Referring to FIG. 7, the user interface window 700 comprises a fourth area 710, a fifth area 720, and a sixth area 730.

The fourth area 710 is an area to display an image forming apparatus to perform a print job.

The fifth area 720 is an area to receive a print option. Specifically, the fifth area 720 may display an area of print options supported by a selected image forming apparatus and receive a user selection on the displayed area of print options.

The sixth area 730 is an area to receive a print command. If a user selects the sixth area 730 after selecting a print option, the electronic apparatus 100 generates print data by reflecting the print option, and the generated print data is transmitted to the image forming apparatus displayed on the fourth area 710.

Figure 8:
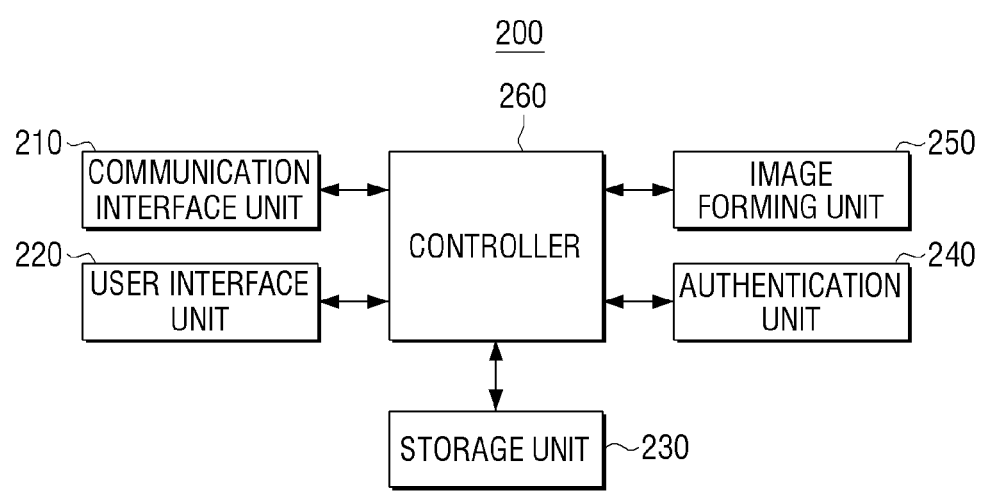
FIG. 8 is a block diagram illustrating an image forming apparatus according to an exemplary embodiment of the present general inventive concept.

FIG. 8 is a block diagram illustrating the image forming apparatus 200 according to an exemplary embodiment of the present general inventive concept.

Referring to FIG. 8, the image forming apparatus 200 may include a communication interface unit 210, a user interface unit 220, a storage unit 230, an authentication unit 240, an image forming unit 250 and a controller 260. Herein, the image forming apparatus 200 may be copy machine, printer, scanner, fax machine, or a Multi-Function Peripheral (MFP) that performs the above functions in a single device.

The communication interface unit 210 is formed to connect the image forming apparatus 200 to an external apparatus, and the connection may be performed not only through LAN and Internet network but also through a USB port and a wireless module. In this case, the communication interface unit 210 may be connected to an external apparatus using not only the wireless network method but also the WiFi Direct method.

The communication interface unit 210 receives connection request information. Specifically, the communication interface unit 210 may receive a connection request information to perform the WiFi Direct connection from the electronic apparatus 100.

In addition, the communication interface unit 210 transmits authentication information. Specifically, the communication interface unit 210 may transmit authentication information to authenticate the WiFi Direct connection with respect to the electronic apparatus 100 that is either authenticated by the authentication unit 240, which will be explained later, or that is approved by a user.

Further, the communication interface unit 210 receives print data. Specifically, the communication interface unit 210 may receive print data from the electronic apparatus 100 that is connected using the WiFi Direct method. Herein, the print data may be data in a print language such as Postscript (PS), Printer Control Language (PCL), etc., but is not limited thereto, and if the image forming apparatus 200 supports direct-printing, the print data may be a file such as PDF, XPS, BMP, JPG, etc., but is not limited thereto.

The communication interface unit 210 may transmit a print performance result to an external apparatus. Specifically, once a print job is completed, the communication interface unit 210 may inform the electronic apparatus 100 that the print job is completed.

The user interface unit 220 includes a plurality of function keys through which a user may set or select various functions supported by the image forming apparatus 200, and may display various information provided by the image forming apparatus 200. The user interface unit 220 may be an apparatus such as a touch screen that may perform input and output of data simultaneously, or an apparatus that combines a mouse and a monitor.

The user interface unit 220 displays that there is an apparatus that requests a connection according to the WiFi Direct method. Specifically, when receiving connection request information from the electronic apparatus 100, the user interface unit 220 may display that there is an electronic apparatus 100 that requests a connection according to the WiFi Direct method. Accordingly, a user may determine whether to perform wireless connection with the electronic apparatus 100 that requests a connection according to the WiFi Direct method and perform authentication of the corresponding electronic apparatus 100 on a user interface window.

Meanwhile, the operations of displaying the information and receiving authentication by the user interface unit 220 may be limited by the operation of the authentication unit 240, which will be explained later. Specifically, if preset authentication information is included in the received connection request information, authentication is performed automatically, and thus the above operations of displaying the information and receiving authentication may be omitted.

The storage unit 230 stores predetermined authentication information. Herein, the authentication information may be one of information regarding an application (e.g., a mobile print application) or a pin code pre-stored in the image forming apparatus 200.

In addition, the storage unit 230 may store print data received through the communication interface unit 210. The storage unit 230 may include an internal storage medium within the image forming apparatus 200 or an external storage medium, for example, a removable disk including a USB memory, a web server via network, etc., but is not limited thereto.

The authentication unit 240 authenticates an electronic apparatus 100. Specifically, if preset authentication information is included in the received connection request information, the authentication unit 240 may perform authentication of the corresponding electronic apparatus 100 by comparing the predetermined authentication with authentication information pre-stored in the image forming apparatus 200. If it is determined that the connection request information is received from an authenticated electronic apparatus 100 based on the authentication result, the authentication unit 240 may control the communication interface unit 210 not to perform the operations of a general manual authentication process, that is, not to perform the operations of a user interface unit, and instead to transmit the authentication information to the corresponding electronic apparatus 100.

The image forming unit 250 forms an image. Specifically, the image forming unit 250 may form an image regarding print data received through the communication interface unit 210. In the exemplary embodiment, only the image forming unit 250 that performs a print job is illustrated and explained, but if the image forming apparatus 200 is a MFP capable of performing a scanning job and a fax job, etc., the image forming apparatus 200 may further include a component to perform a scanning job and perform a fax transmission/reception job.

The controller 260 controls each component of the image forming apparatus 200. Specifically, if connection request information is received from an external apparatus using the WiFi Direct method, the controller 260 determines whether preset authentication information is included in the received connection request information.

If it is determined that preset authentication information is included in the received connection request information, the controller 260 may control the authentication unit 240 to perform authentication automatically according to the predetermined authentication information. In contrast, if preset authentication information is not included, the controller 260 may control the user interface unit 210 to display that there is an apparatus that requests connection according to the WiFi Direct method, and if an authentication command is input by a user, the controller 260 may transmit authentication information to a corresponding electronic apparatus assuming that the corresponding apparatus is an authenticated apparatus. Through the above process, the electronic apparatus 100 and the image forming apparatus 200 are connected according to the WiFi Direct method, and if print data is received in this state, the controller 260 may control the image forming unit 250 to print the received print data.

As described above, the image forming apparatus 200 according to an exemplary embodiment performs an authentication process automatically without a user's authentication process when receiving connection request information including predetermined authentication information, and thus user convenience may be improved.

Figure 9:
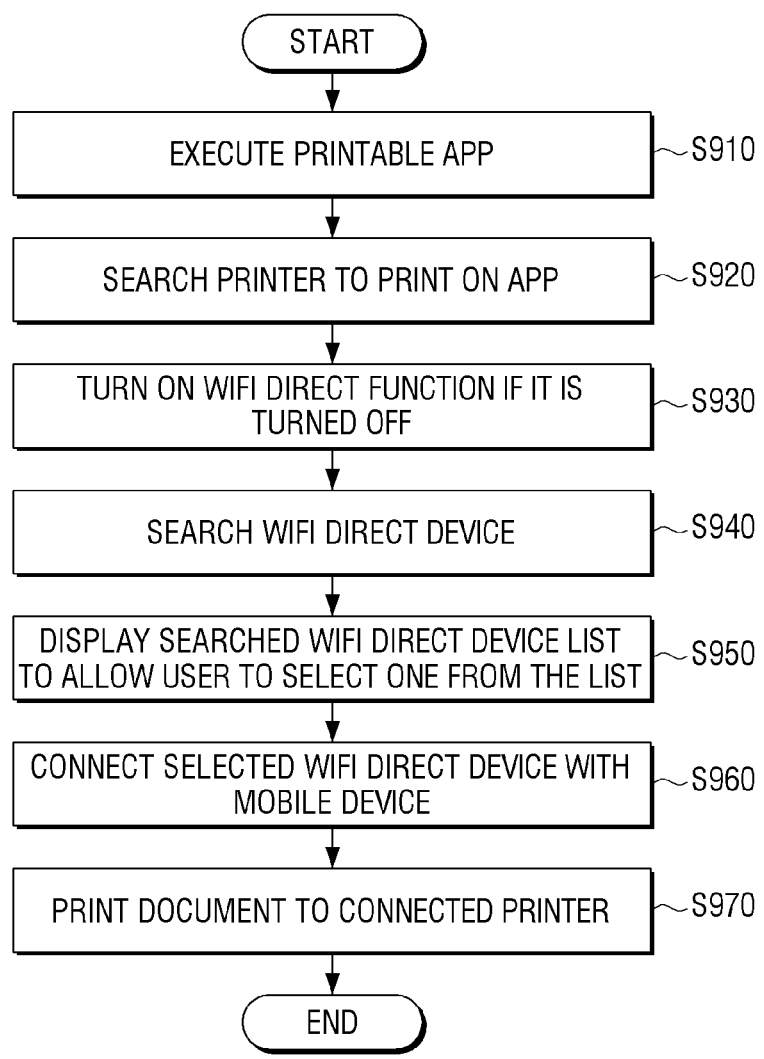
FIG. 9 is a flowchart illustrating a print controlling method according to an exemplary embodiment of the present general inventive concept.

FIG. 9 is a flowchart provided to explain a print controlling method according to an exemplary embodiment of the present general inventive concept.

First of all, if an application to perform a print job is operated (S910), an image forming apparatus 200 that supports communication according to the wireless network method is searched (S920).

If the WiFi Direct function of the electronic apparatus 100 is deactivated, the WiFi Direct function may be activated (S930), and image forming apparatuses in the vicinity of the electronic apparatus 100 may be searched (S940). Specifically, wireless communication apparatuses that support communication according to the WiFi Direct method around the electronic apparatus 100 may be searched, and image forming apparatuses may be identified from among the searched wireless communication apparatuses using information regarding the type of the wireless communication apparatuses.

The searched image forming apparatuses are displayed (S950). Specifically, the searched image forming apparatuses supporting the wireless network method and the WiFi Direct method may be displayed. Meanwhile, if only one image forming apparatus is searched, the above displaying operation may be omitted.

If one image forming apparatus is selected from among the displayed image forming apparatuses, wireless connection with the selected image forming apparatus is performed (S960). Specifically, if the selected image forming apparatus is an image forming apparatus that supports the wireless network method, a connection may be performed using the wireless network method. In contrast, if the selected image forming apparatus is an image forming apparatus supporting the WiFi Direct method, a connection may be performed using the WiFi Direct method. In this case, connection according to the WiFi Direct method may be performed by transmitting connection request information including preset authentication information to the selected image forming apparatus and receiving authentication information from the corresponding image forming apparatus. As such, by transmitting connection request information including predetermined authentication information, wireless connection between the image forming apparatus and the electronic apparatus may be completed without a separate user authentication operation.

Once wireless connection with the selected image forming apparatus is completed, generated print data is transmitted to the selected image forming apparatus (S970). Specifically, if the selected image forming apparatus supports the WiFi Direct method, the electronic apparatus 100 may transmit print data to the selected image forming apparatus using the WiFi Direct method.

As such, the print controlling method according to FIG. 9 activates the WiFi Direct function automatically without requiring a user setting, once a print application is operated, and thus a user does not have to activate the WiFi Direct function that is difficult to find in a system menu. In addition, authentication of the image forming apparatus 200 may be performed automatically without user authentication, and thus wireless connection with the image forming apparatus 200 may be performed in more rapid manner. The print controlling method illustrated in FIG. 9 may be executed in an electronic apparatus 100 having the configuration of FIG. 2 or FIG. 3, but the method may also be executed in an electronic apparatus having other configuration.

Meanwhile, in the above description regarding FIG. 9, image forming apparatuses are searched not only using the WiFi Direct method but also using the wireless network method, but the image forming apparatuses may be searched using only the WiFi Direct method.

Figure 10:
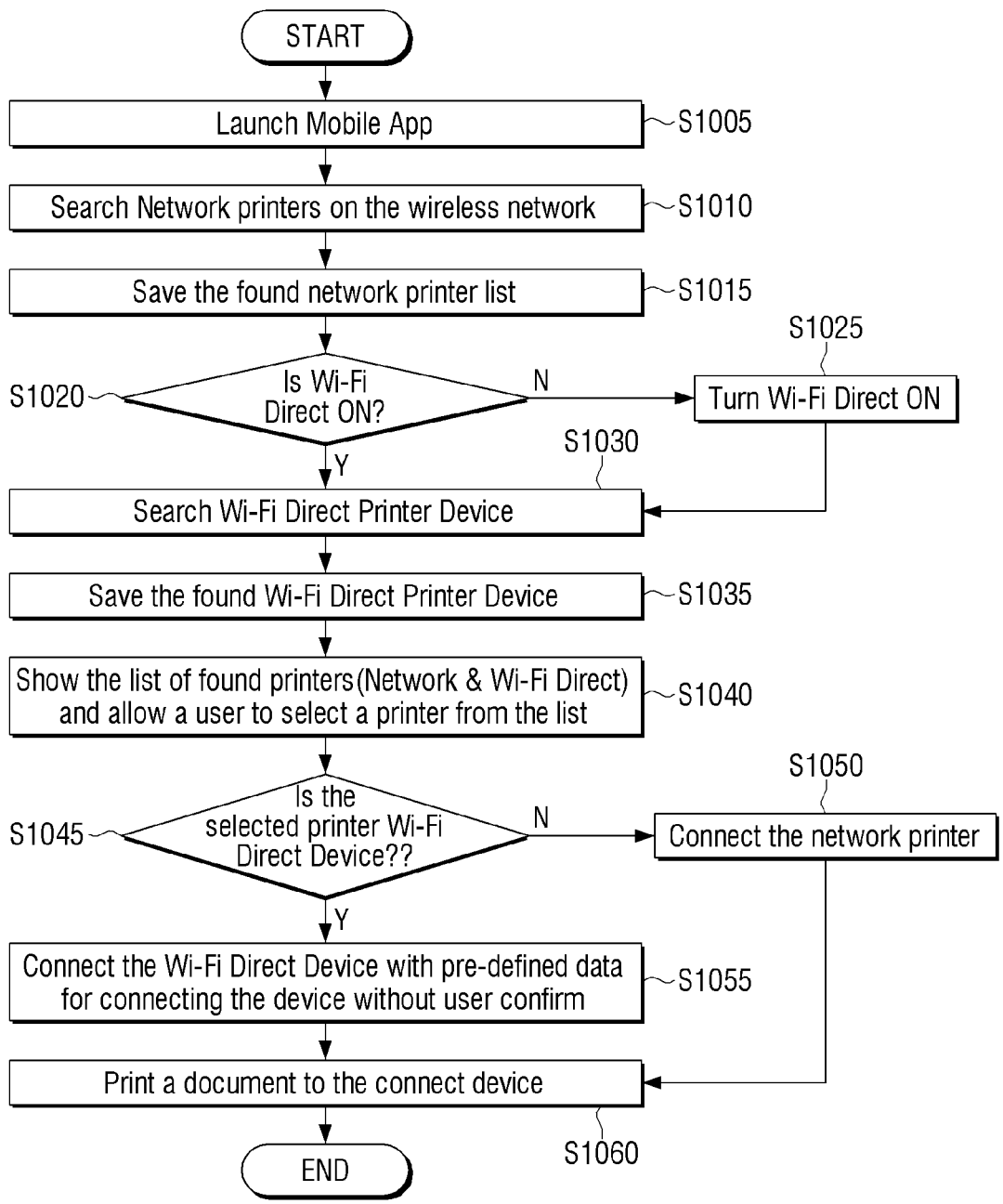
FIG. 10 is a flowchart illustrating a print controlling method according to a second exemplary embodiment of the present general inventive concept.
Figure 11:
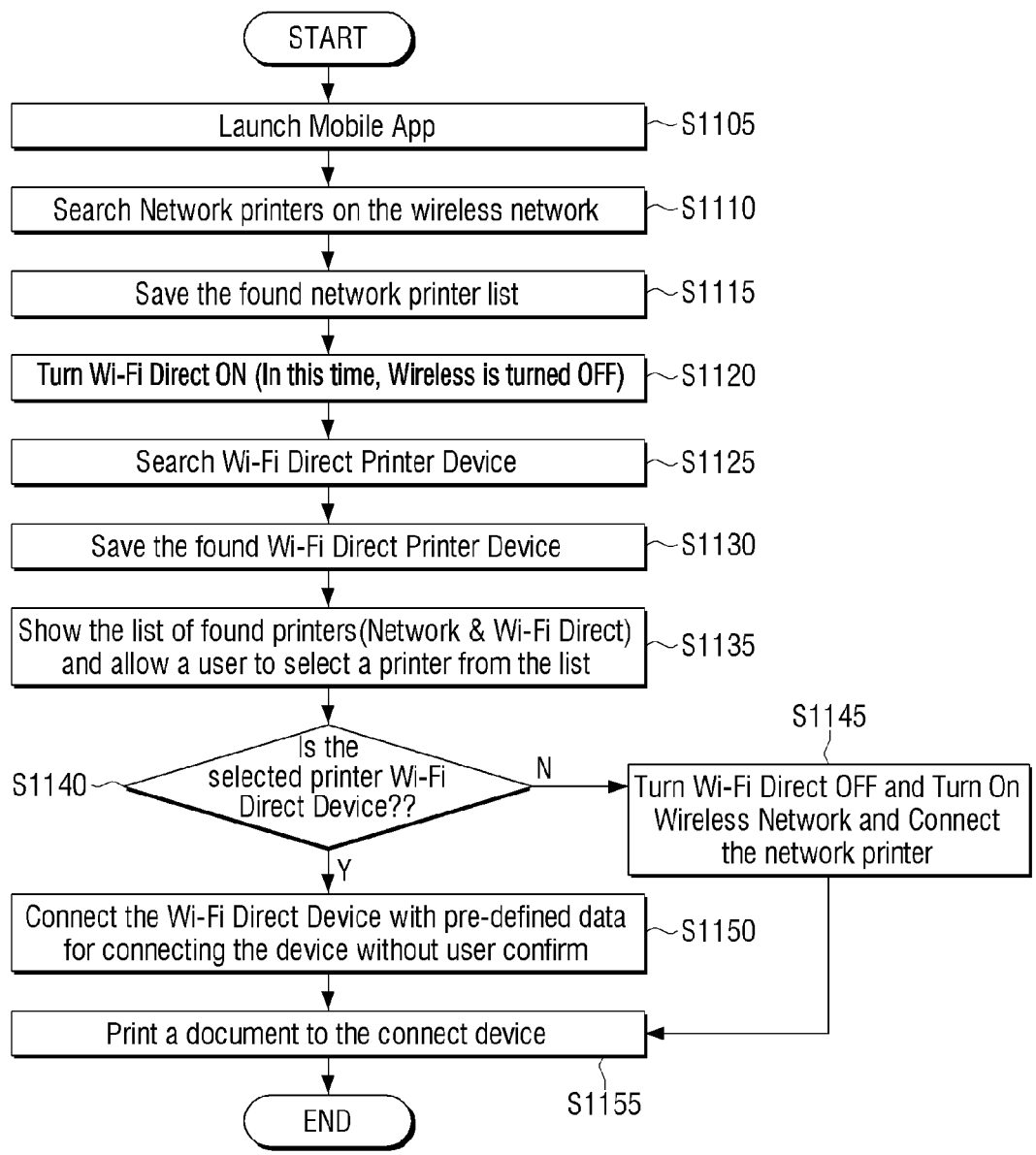
FIG. 11 is a flowchart illustrating a print controlling method according to a third exemplary embodiment of the present general inventive concept.
Figure 12:
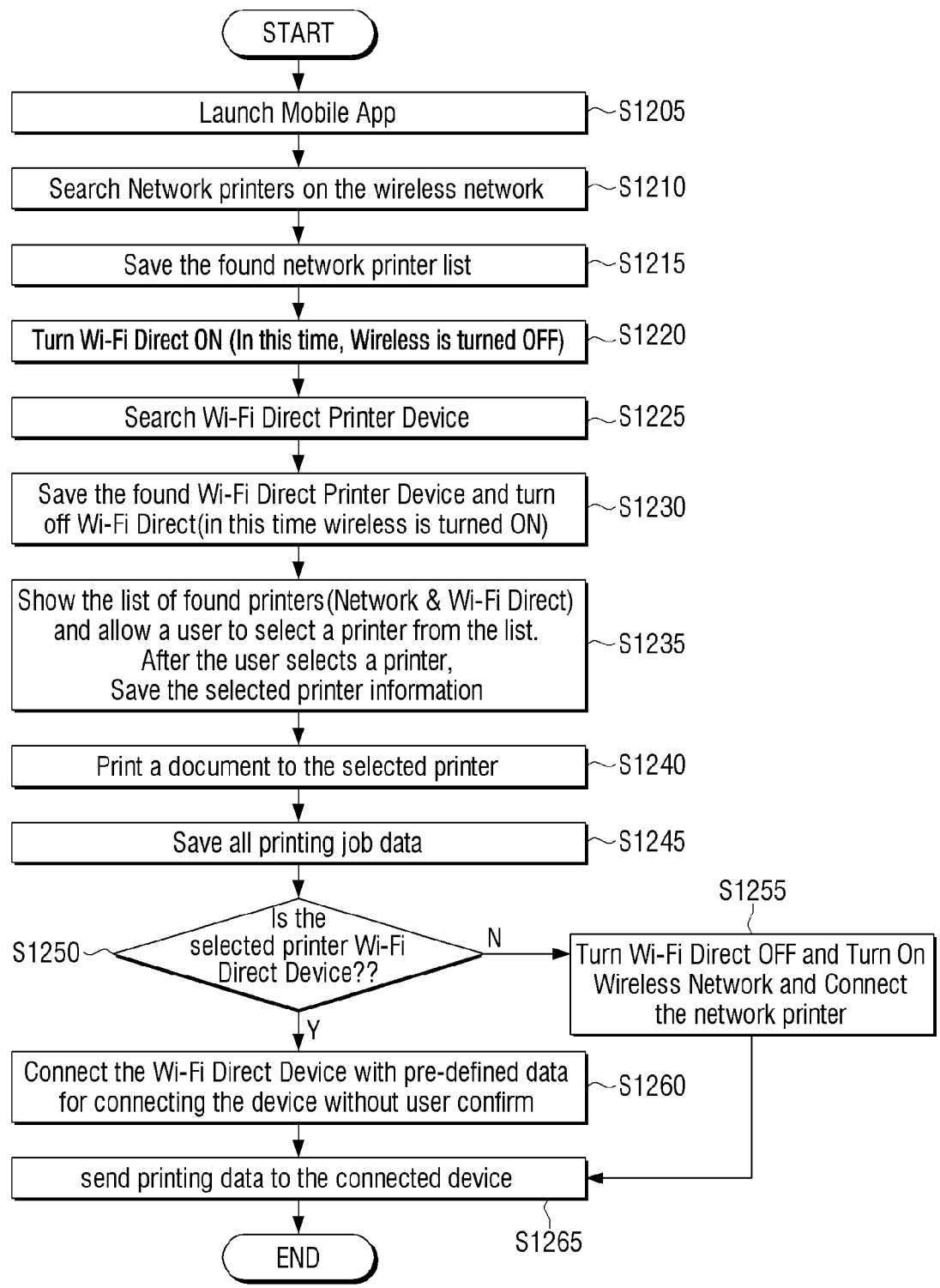
FIG. 12 is a flowchart illustrating a print controlling method according to a fourth exemplary embodiment of the present general inventive concept.

FIGS. 10 through 12 are flow charts provided to explain a print controlling method according to whether the WiFi is supported.

Specifically, FIG. 10 is a flowchart provided to explain a print controlling method when the electronic apparatus 100 supports both the wireless network method and the WiFi Direct method simultaneously.

Referring to FIG. 10, if a user selects a print application from among various applications installed in the electronic apparatus 100, the print application is operated (S1005).

Once the print application is operated, network image forming apparatuses that are connected through the wireless network method are searched (S1010), and the searched image forming apparatuses are stored in a list (S1015).

Subsequently, the print application determines whether the WiFi Direct function of the electronic apparatus 100 is activated (S1020), and if it is determined that the WiFi Direct function is not activated (S1020-N), the WiFi Direct function is activated (S1025).

If the WiFi Direct function is activated, wireless communication apparatuses supporting communication according to the WiFi Direct method are searched, only the wireless communication apparatuses of having a printer type are extracted using information regarding the type of the searched wireless communication apparatuses (S1030), and the extracted wireless communication apparatuses are stored in a list (S1035).

The searched image forming apparatuses are displayed (S1040). Specifically, both the network printers that are connectable using the wireless network method and the WiFi Direct apparatuses that are connectable using the WiFi Direct method are displayed. Meanwhile, such a displaying operation may be performed only when a plurality of image forming apparatuses are displayed. That is, if only one image forming apparatus is searched, the above displaying and selecting operations may be omitted.

If the image forming apparatus selected by the user is not a WiFi Direct apparatus (S1045-N), wireless connection with a network printer is performed (S1050). Since the operation of performing wireless connection with a network printer is already known in the related art, specific description thereof will not be provided.

Meanwhile, if the image forming apparatus selected by the user is a WiFi Direct apparatus (S1045-Y), connection with the WiFi Direct apparatus is performed through the network manager 110 (S1055). Specifically, it is requested to connect the selected WiFi Direct apparatus by including preset information (executed APP information) in the WiFi Direct information. Accordingly, the image forming apparatus that is the WiFi Direct apparatus receives the WiFi Direct connection request and extracts preset authentication information from the received connection request. If the extracted authentication information is valid and the corresponding application is an application requesting automatic connection, a connection is performed automatically without user confirmation. Meanwhile, in the above description, only application information is used as predetermined authentication information, but a pin code or a password may also be used as predetermined authentication information.

Subsequently, if a user selects and prints a document, print data regarding the selected document is generated and the generated print data is transmitted to the image forming apparatus that is connected wirelessly (S1060).

In the above print controlling method according to an exemplary embodiment, once a print application is operated, the activation state of the WiFi Direct function is changed automatically without requiring a user setting, and thus, user convenience is improved.

FIG. 11 is a flowchart provided to explain a print controlling method when the electronic apparatus 100 does not support both the wireless network method and the WiFi Direct method simultaneously.

Referring to FIG. 11, the wireless network method is currently activated. In this state, if a user selects a print application from among various applications installed in the electronic apparatus 100, the print application is operated (S1105).

Once the print application is operated, network image forming apparatuses that are connectable through the wireless network method are searched (S1110), and the searched image forming apparatuses are stored in a list (S1115).

Subsequently, the print application activates the WiFi Direct function of the electronic apparatus 100 (S1120). In this case, the electronic apparatus 100 does not support the wireless network method and the WiFi Direct method simultaneously, and thus the communication method according to the wireless network method is deactivated.

Once the WiFi Direct function is activated, wireless communication apparatuses supporting communication according to the WiFi Direct method are searched, only the wireless communication apparatuses having a printer type are extracted using information regarding the type of the searched wireless communication apparatuses (S1125), and the extracted wireless communication apparatuses are stored in a list (S1130).

The searched image forming apparatuses are displayed (S1135). Specifically, both the network printers that are connectable using the wireless network method and the WiFi Direct apparatuses that are connectable using the WiFi Direct method are displayed. Meanwhile, such a displaying operation may be performed only when a plurality of image forming apparatuses are displayed. That is, if only one image forming apparatus is searched, the above displaying and selecting operations may be omitted.

If the image forming apparatus selected by the user is not a WiFi Direct apparatus (S1140-N), the WiFi Direct function is deactivated and the wireless network method is activated, and wireless connection with a network printer is performed (S1145).

Meanwhile, if the image forming apparatus selected by the user is a WiFi Direct apparatus (S1140-Y), connection with the WiFi Direct apparatus is performed through the network manager 110 (S1150). Since such operations have been explained above in detail, further description will not be provided.

Subsequently, if a user selects and prints a document, print data regarding the selected document is generated and the generated print data is transmitted to the image forming apparatus that is connected wirelessly (S1155).

In the above print controlling method according to an exemplary embodiment, the WiFi Direct function and the wireless network function may be activated selectively in automatic manner even in an electronic apparatus which does not support both the WiFi Direct function and the wireless network function simultaneously, and thus user convenience is improved.

FIG. 12 is a flowchart provided to explain a print controlling method when the electronic apparatus 100 uses the WiFi Direct method and thus, cannot use the wireless network method and a 3G/4G network. Specifically, if the electronic apparatus 100 is connected to the WiFi Direct, a user cannot use Internet contents since Internet connection is not available.

Referring to FIG. 12, the wireless network method is currently activated. In this state, if a user selects a print application from among various applications installed in the electronic apparatus 100, the print application is operated (S1205).

Once the print application is operated, network image forming apparatuses which are connectable through the wireless network method are searched (S1210), and the searched image forming apparatuses are stored in a list (S1215).

Subsequently, the print application activates the WiFi Direct function of the electronic apparatus 100 (S1220). In this case, the electronic apparatus 100 does not support the wireless network method and the WiFi Direct method simultaneously, and thus the communication method according to the wireless network method is deactivated.

Once the WiFi Direct function is activated, wireless communication apparatuses supporting communication according to the WiFi Direct method are searched, only the wireless communication apparatuses having a printer type are extracted using information regarding the type of the searched wireless communication apparatuses (S1225), and the extracted wireless communication apparatuses are stored in a list (S1230).

The searched image forming apparatuses are displayed (S1235). Specifically, both the network printers that are connectable using the wireless network method and the WiFi Direct apparatuses that are connectable using the WiFi Direct method are displayed. Meanwhile, such a displaying operation may be performed only when a plurality of image forming apparatuses are displayed. That is, if only one image forming apparatus is searched, the above displaying and selecting operations may be omitted.

If the selected image forming apparatus selected is not a WiFi Direct apparatus, it is determined whether the type of document selected by the user is Internet contents or not. If it is determined that the document type is Internet contents, the Internet contents cannot be downloaded while the WiFi Direct function is activated. Therefore, the WiFi Direct function is deactivated, the wireless network method is activated, a file regarding the contents to be printed is received (S1240), and print data is generated (S1245).

Subsequently, if the image forming apparatus selected by the user is not a WiFi Direct apparatus (S1250-N), the WiFi Direct function is deactivated, the wireless network method is activated, and wireless connection with a network printer is performed (S1255).

Meanwhile, if the image forming apparatus selected by the user is a WiFi Direct apparatus (S1250-Y), connection with the WiFi Direct apparatus is performed through the network manager 110 (S1260). Since such operations have been explained above in detail, further description will not be provided.

Subsequently, the pre-generated print data is transmitted to the image forming apparatus that is connected wirelessly (S1265).

In the above print controlling method according to an exemplary embodiment, the WiFi Direct function and the wireless network function may be activated selectively in automatic manner even in an electronic apparatus that does not support both the WiFi Direct function and the wireless network function simultaneously. In addition, Internet contents may be downloaded in advance as the function setting is changed adaptively, allowing a user to perform a print job easily.

FIG. 13 is a flowchart provided to explain an image forming method according to an exemplary embodiment of the present general inventive concept.

Referring to FIG. 13, first of all, connection request information is received from an electronic apparatus using the WiFi Direct method (S1310).

Subsequently, it is determined whether the electronic apparatus which has transmitted the connection request information is an authenticated apparatus or not (S1320). Specifically, preset authentication information is included in the received connection request information, and authentication regarding the corresponding electronic apparatus may be performed by comparing the included preset authentication information with authentication information pre-stored in the image forming apparatus 200. Meanwhile, if preset authentication information is not included in the connection request information, it is displayed that there is an apparatus requesting connection according to the WiFi Direct method, and if an approval command regarding the corresponding apparatus is input, the corresponding electronic apparatus is determined to be an authenticated apparatus.

If a user approval command regarding an electronic apparatus is input, or preset authentication information is included in the received connection request information, approval information is transmitted to the corresponding electronic apparatus, and thus, the corresponding electronic apparatus is connected using the WiFi Direct method (S1330).

If print data is received after the electronic apparatus is connected using the WiFi Direct method (S1340), the received print data is printed (S1350).

As such, the image forming apparatus according to an exemplary embodiment may perform an approval process automatically without a user's approval procedure upon receiving connection request information including predetermined authentication information, and thus user convenience is improved. The image forming method illustrated in FIG. 13 may be executed not only in an image forming apparatus having the configuration of FIG. 8 and but also in an image forming apparatus having other configuration.

The present general inventive concept, such as the method of performing image compensation as described above, can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
   a network manager to automatically activate a WiFi Direct function of the electronic apparatus when an application to perform a print job is operated and which is connected to an image forming apparatus around the electronic apparatus using a WiFi Direct method;
   a job generator to generate print data regarding a file based on an input print command to print the file; and
   a controller to transmit the generated print data to the image forming apparatus that is connected using the WiFi Direct method,
   wherein the network manager searches wireless communication apparatuses around the electronic apparatus that support communication according to the WiFi Direct method, identifies image forming apparatuses from the searched wireless communication apparatuses and connects to the wireless communication apparatuses that are identified as image forming apparatuses according to the WiFi Direct method, and
   wherein the network manager transmits connection request information including preset authentication information to the image forming apparatus, and if approval information is received from the image forming apparatus, connects to the image forming apparatus using the WiFi Direct method.

2. The apparatus as claimed in claim 1, wherein the network manager identifies image forming apparatuses using information regarding apparatus type of the searched wireless communication apparatuses.

3. The apparatus as claimed in claim 1, further comprising:
   a user interface unit that displays the wireless communication apparatuses that are identified as image forming apparatuses, and receives a selection of one wireless communication apparatus from among the displayed wireless communication apparatuses, wherein the network manager connects to the selected wireless communication apparatus according to the WiFi Direct method.

4. The apparatus as claimed in claim 3, wherein the user interface unit displays searched wireless communication apparatuses when there are a plurality of wireless communication apparatuses that are identified as the image forming apparatuses.

5. The apparatus as claimed in claim 1, wherein the preset authentication is at least one of information on the application and a pin code pre-stored in the image forming apparatus.

6. The apparatus as claimed in claim 1, wherein the network manager connects to a network image forming apparatus around the electronic apparatus using a wireless network method when there is no image forming apparatus that supports communication according to the WiFi Direct method around the electronic apparatus.

7. The apparatus as claimed in claim 6, wherein the network manager turns off the WiFi Direct function of the electronic apparatus if the electronic apparatus does not support both the WiFi Direct method and a wireless network method simultaneously.

8. The apparatus as claimed in claim 1, wherein the controller controls the network manager to connect to an image forming apparatus using a wireless network method if the electronic apparatus does not support both the WiFi Direct method and the wireless network method simultaneously and the file includes Internet contents.

9. A print controlling method of an electronic apparatus, comprising:
   if an application to perform a print job is operated, automatically activating a WiFi Direct function of the electronic apparatus;
   connecting to an image forming apparatus around the electronic apparatus using a WiFi Direct method;
   generating print data regarding a file based on an input print command to print the file; and
   transmitting the generated print data to the image forming apparatus that is connected using the WiFi Direct method,
   wherein the connecting comprises searching wireless communication apparatuses around the electronic apparatus that support communication according to the WiFi Direct method, identifying image forming apparatuses from the searched wireless communication apparatuses and connecting to the wireless communication apparatuses that are identified as image forming apparatuses according to the WiFi Direct method, and
   wherein the connecting comprises transmitting connection request information including preset authentication information to the image forming apparatus, and if approval information is received from the image forming apparatus, connecting to the image forming apparatus using the WiFi Direct method.

10. The method as claimed in claim 9, wherein the connecting comprises identifying image forming apparatuses using information regarding apparatus type of the searched wireless communication apparatuses.

11. The method as claimed in claim 9, further comprising:
   displaying the wireless communication apparatuses that are identified as image forming apparatuses; and
   receiving a selection of one wireless communication apparatus from among the displayed wireless communication apparatuses,
   wherein the connecting comprises connecting to the selected wireless communication apparatus according to the WiFi Direct method.

12. The method as claimed in claim 11, wherein the displaying comprises displaying searched wireless communication apparatuses when there are a plurality of wireless communication apparatuses that are identified as the image forming apparatuses.

13. The method as claimed in claim 9, wherein the preset authentication is at least one of information on the application and a pin code pre-stored in the image forming apparatus.

14. The method as claimed in claim 9, wherein the connecting comprises connecting to a network image forming apparatus around the electronic apparatus using a wireless network method when there is no image forming apparatus that supports communication according to the WiFi Direct method around the electronic apparatus.

15. The method as claimed in claim 14, further comprising:
   turning off the WiFi Direct function of the electronic apparatus if the electronic apparatus does not support both the WiFi Direct method and a wireless network method simultaneously.

16. The method as claimed in claim 9, wherein the connecting comprises connecting to an image forming apparatus using a wireless network method if the electronic apparatus does not support both the WiFi Direct method and the wireless network method simultaneously and the file includes Internet contents.

17. A non-transitory computer readable recording medium including a program to execute a print controlling method of an electronic apparatus, wherein the print controlling method comprises:
   if an application to perform a print job is operated, automatically activating a WiFi Direct function of the electronic apparatus;
   connecting to an image forming apparatus around the electronic apparatus using a WiFi Direct method;
   generating print data regarding a file based on an input print command to print the file; and
   transmitting the generated print data to the image forming apparatus that is connected using the WiFi Direct method,
   wherein the connecting comprises searching wireless communication apparatuses around the electronic apparatus that support communication according to the WiFi Direct method, identifying image forming apparatuses from the searched wireless communication apparatuses and connecting to the wireless communication apparatuses that are identified as image forming apparatuses according to the WiFi Direct method, and
   wherein the connecting comprises transmitting connection request information including preset authentication information to the image forming apparatus, and if approval information is received from the image forming apparatus, connecting to the image forming apparatus using the WiFi Direct method.

* * * * *